United States Patent [19]
Sparks

[11] 3,777,974
[45] Dec. 11, 1973

[54] DAMPER CONTROL MECHANISM

[76] Inventor: Albert J. Sparks, 8140 Summerfield, Lambertville, Mich. 48144

[22] Filed: Apr. 17, 1972

[21] Appl. No.: 244,718

[52] U.S. Cl............... 236/49, 74/422, 251/134
[51] Int. Cl................ F16k 31/54, F16k 31/04
[58] Field of Search............. 236/49, 74; 74/421 A, 422, 89.18; 251/134

[56] References Cited
UNITED STATES PATENTS

| | | | |
|---|---|---|---|
| 3,282,557 | 11/1966 | Capps | 251/134 |
| 2,983,479 | 5/1961 | Thomas | 74/89.18 X |
| 2,267,114 | 12/1941 | Lear et al. | 192/18 |
| 3,319,646 | 5/1967 | Smulka | 251/133 X |

Primary Examiner—William E. Wayner
Attorney—Arthur Raisch et al.

[57] ABSTRACT

A damper control mechanism for a damper which is pivotally mounted in a duct by a shaft comprising a gear sector fixed to the shaft and an electric motor pivotally suspended from said shaft and having a gear meshed with said gear sector. The electric motor comprising a low-voltage type and the battery for operating the same is suspended in the same manner as the motor. The mechanism can be mounted within or externally of the duct.

6 Claims, 9 Drawing Figures

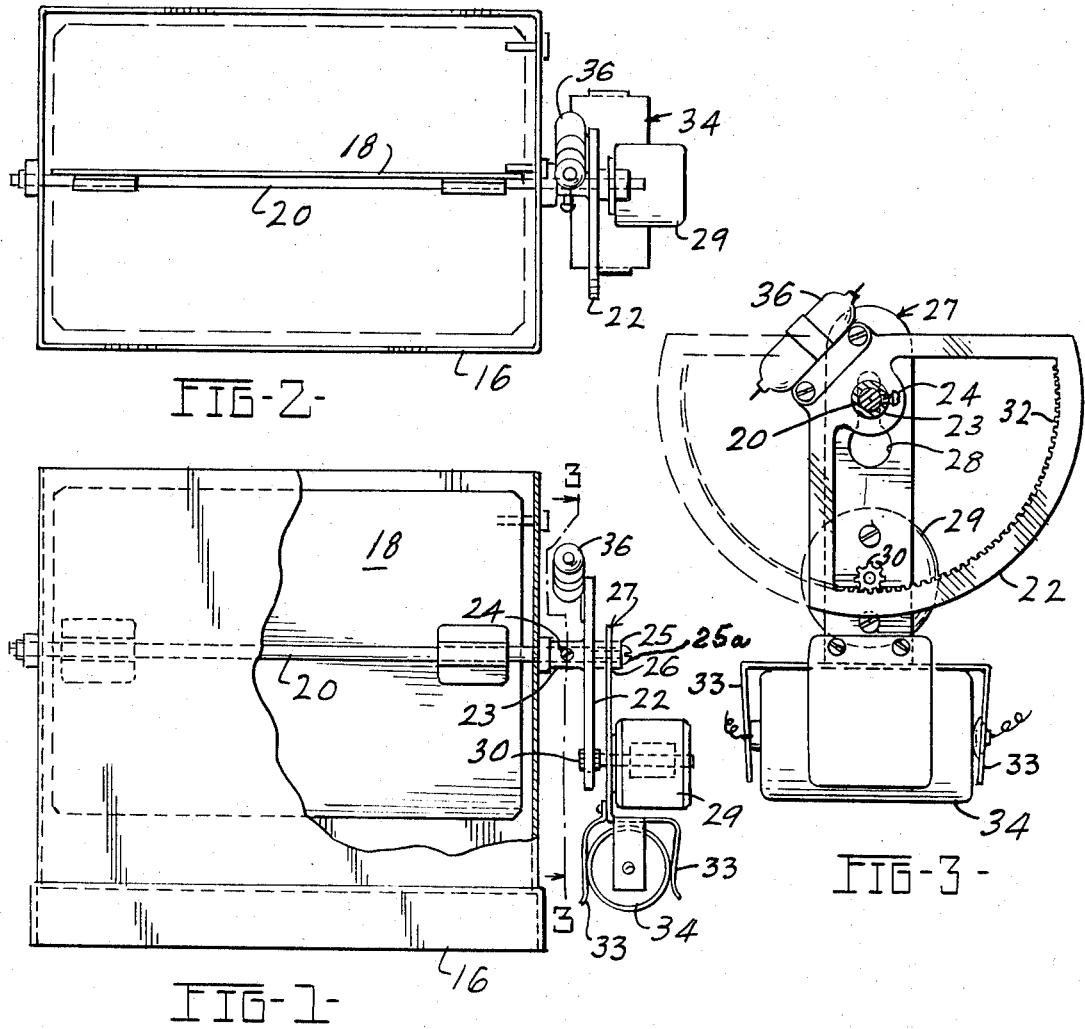
FIG-2-
FIG-3-
FIG-1-
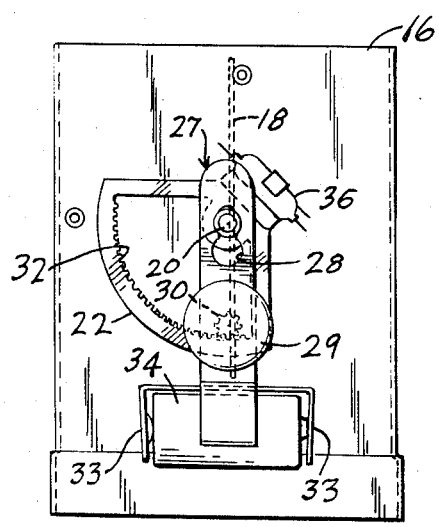
FIG-4-
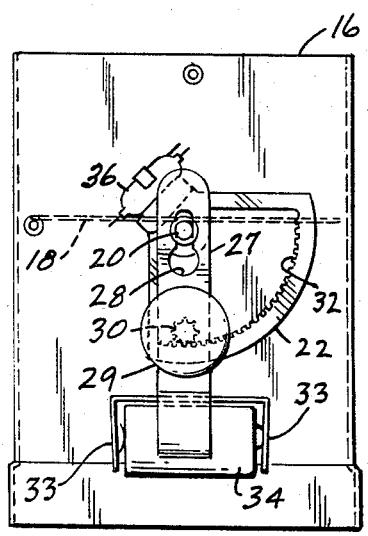
FIG-5-

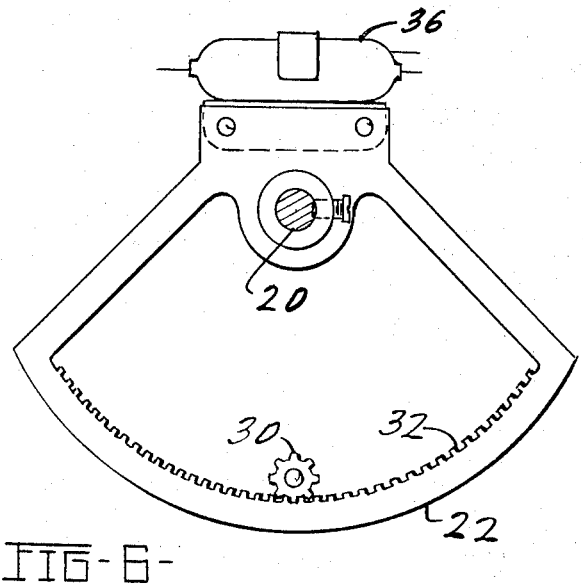
FIG-6-
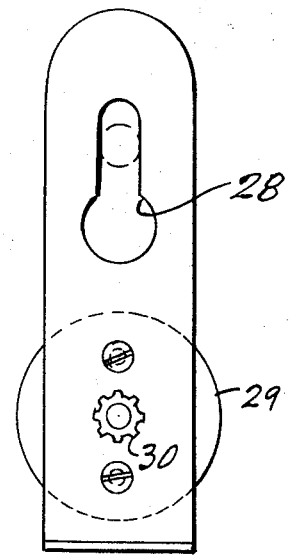
FIG-7-
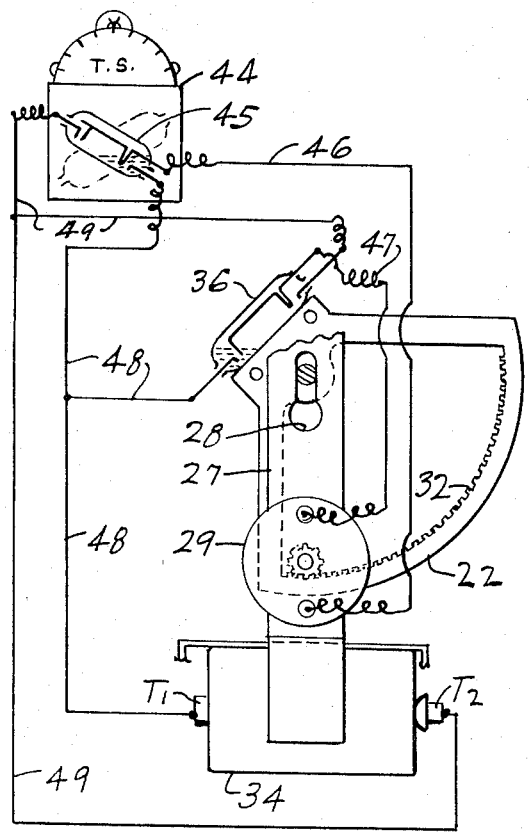
FIG-9-
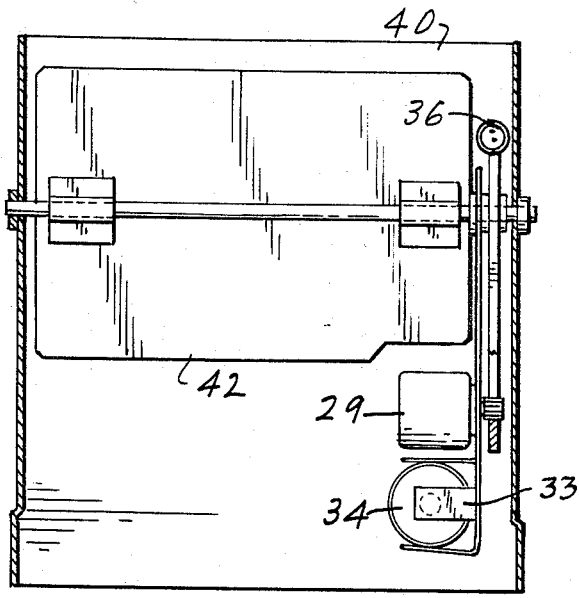
FIG-8-

3,777,974

DAMPER CONTROL MECHANISM

This invention relates to damper control mechanisms.

BACKGROUND OF THE INVENTION

It is common to use various damper control mechanisms in heating and air-conditioning systems to open and close the damper in response to functioning of a thermostat or manually. One common type that is used comprises a chain with weights connected to the damper. The prior art types with which I am familiar are quite cumbersome, complex, difficult to install and costly.

Among the objects of the invention are to provide a damper control mechanism which is low in cost; which can be readily applied to the damper either within or externally of the duct depending upon accessibility; which is substantially self-contained and only requires wires extending therefrom to a thermostat; and which is easy to service and has its own self-contained energy source in the form of a low-voltage battery.

SUMMARY OF THE INVENTION

A damper control mechanism for a damper which is pivotally mounted in a duct by a shaft comprising a gear sector fixed to the shaft and an electric motor pivotally suspended from said shaft and having a gear meshed with said gear sector. The electric motor comprises a low-voltage type and the battery for operating the same is suspended in the same manner as the motor. The mechanism can be mounted within or externally of the duct.

DESCRIPTION OF THE DRAWINGS

FIG. 1 is a part sectional elevational view of a duct and damper control mechanism embodying the invention.

FIG. 2 is a plan view of the same.

FIG. 3 is a sectional view taken along the line 3—3 in FIG. 2.

FIG. 4 is a side elevational view taken from the right in FIG. 1.

FIG. 5 is a view similar to FIG. 4 showing parts in a different operative position.

FIG. 6 is a side elevational view similar to FIG. 3, parts being broken away, and the parts being shown in a different operative position.

FIG. 7 is a view similar to FIG. 3, parts being broken away.

FIG. 8 is a sectional elevational view of a modified form of the invention.

FIG. 9 is a schematic wiring diagram showing the manner in which the damper control mechanism is connected.

DESCRIPTION

Referring to FIGS. 1-7, the damper control mechanism embodying the invention is adapted to be utilized with a duct 16 which has a damper 18 pivoted between the side wall thereof by a shaft 20. A gear sector 22 is fixed to the shaft 20 by a set screw 24 extending through a hub 23 of the gear sector 22 so that the sector and damper move together. As shown, the gear sector includes internal gear teeth 32 and has an arcuate extent of 90°.

A motor assembly 26 comprising a support arm 27 is pivoted on shaft 20. Support arm 27 has an elongated opening 28 therein through which the shaft 20 extends and a spacer 25 held in position by screw 25a maintains the support arm 27 in position axially of the shaft 20. Support arm 27 supports a low-voltage direct current reversible electric motor 29 that has a gear 30 thereon meshing with the teeth 32 of the sector 22. The support arm 27 further includes spring support arms 33 for supporting a battery 34 for operating the motor 29. The extent of the elongated opening 28 is sufficient to insure meshing of gear 30 with teeth 32 such that the motor assembly 26, in effect, is mounted on shaft 20 for pivotal and radial movement.

A single pole double throw mercury switch 36 is mounted on the gear sector 22 for movement therewith and functions to de-energize the motor at the limits of movement of the gear sector 22 or, in other words, at the extreme positions of movement of the damper 18.

The manner in which the damper control mechanism is electrically connected is shown in FIG. 9. Thermostat 44 has a single pole double throw mercury switch 45 that is movable to positions corresponding to the temperature reading. Leads 48 extend from terminal $T_1$ of battery 34 to one end of each of switches 36, 45 and leads 49 extend from terminal $T_2$ of battery 34 to the other end of switches 36, 45. A lead 46 extends from the center contact of switch 45 to motor 29 and a lead 47 extends from the center contact of switch 36 to motor 29. Thus, both switches must be in compatible positions to cause energization of motor 29 for rotation in the proper direction.

When the thermostat 44 calls for a movement of the damper depending upon whether it is in a heating or cooling system, the motor 29 is energized causing the gear 30 to be rotated and thereby rotate the sector 22 and, in turn, the damper. When the damper reaches the other extreme of its position, switch 36 interrupts the circuit to the motor 29 thereby de-energizing the motor 29.

When the thermostat calls for movement of the damper in the opposite position, the rotation of the motor is reversed and the motor operates until the damper is moved back to its original position.

In the form of the invention shown in FIGS. 1-8, the control mechanism is shown as being mounted outside the duct. Where the exterior of the duct is not readily accessible and only the interior is accessible, the mechanism can be mounted within the duct as shown in FIG. 8 on the portion of the shaft within the duct 40. Such a construction may involve replacement of the conventional damper with a damper 42 that has a lesser length.

It can thus be seen that there has been provided a damper control system for dampers, shutters and the like which is low in cost and easy to service and which can be mounted either externally or internally on previously fabricated installations. The mechanism is self-contained in that it has its own power source and it requires only leads to a thermostat.

I claim:

1. In a damper control mechanism, the combination comprising a damper, means for mounting said damper within a duct for movement between predetermined positions, a gear sector connected to said damper for movement therewith as the damper is moved in said duct, a motor, a gear driven by said motor, means for suspending said motor with said gear thereon with the gear in mesh with said gear sector, said means for mounting said damper comprising a rotatable shaft on which the damper is fixed, said means supporting said motor comprising a member mounted for pivotal and radial movement with respect to said shaft.

2. In a damper control mechanism, the combination comprising a damper, means for mounting said damper within a duct for movement between predetermined positions, a gear sector connected to said damper for movement therewith as the damper is moved in said duct, a motor, a gear driven by said motor, means for suspending said motor with said gear thereon with the gear in mesh with said gear sector, a thermostat associated with said motor and circuitry connecting said thermostat with said motor to control the operation of said motor whereby when said thermostat indicates that the damper should be moved, said motor is energized causing the gear sector to be moved and, in turn, move said damper to another position, a position responsive switch operable to de-energize the motor when the damper is moved to one or the other of its predetermined positions.

3. In a damper control mechanism, the combination comprising a damper, means for mounting said damper within a duct for movement between predetermined positions, a gear sector connected to said damper for movement therewith as the damper is moved in said duct, a motor, a gear driven by said motor, means for suspending said motor with said gear thereon with the gear in mesh with said gear sector, said gear sector and said means for supporting said motor and said motor being suspended in said duct.

4. In a dmaper control mechanism, the combination comprising a damper, means for mounting said damper within a duct for movement between predetermined positions, an internal gear sector connected to said damper for movement therewith as the damper is moved in said duct, a motor, a gear driven by said motor, means for suspending said motor for pivotal and radial movement with respect to said gear sector and with said gear thereon with the gear in mesh with said gear sector.

5. The combination set forth in claim 1 wherein said gear sector has an internal gear and said gear driven by said motor is maintained in meshing relationship therewith by the action of gravity.

6. The combination set forth in claim 1 wherein said motor comprises a reversible direct current motor and is of a low voltage type including a battery supported by said means for supporting said motor.

* * * * *